INVENTORS
WILLIAM S. TANDLER
MORRIS GROSSMAN
RICHARD H. TOURIN

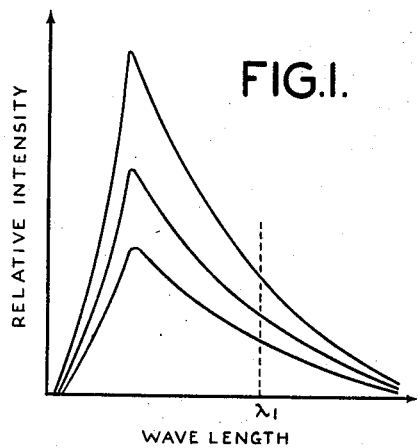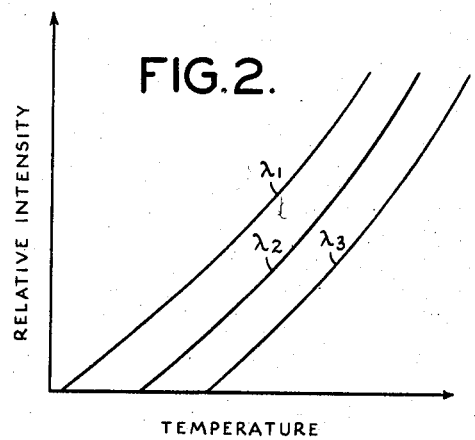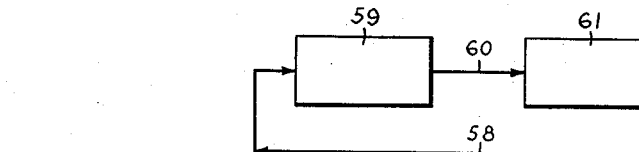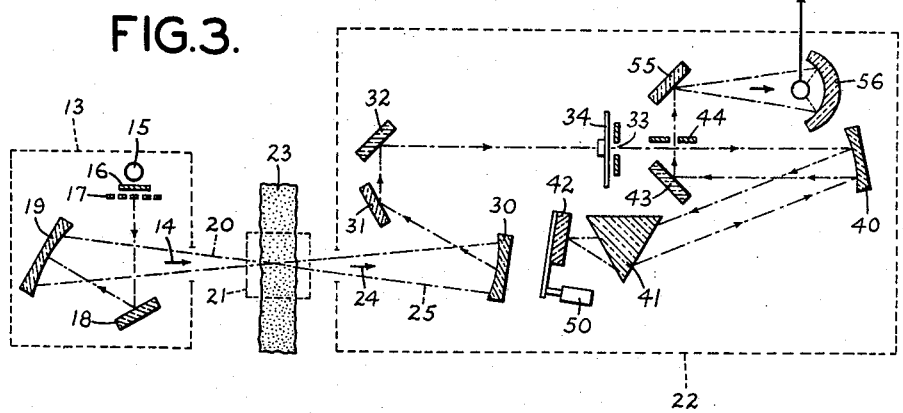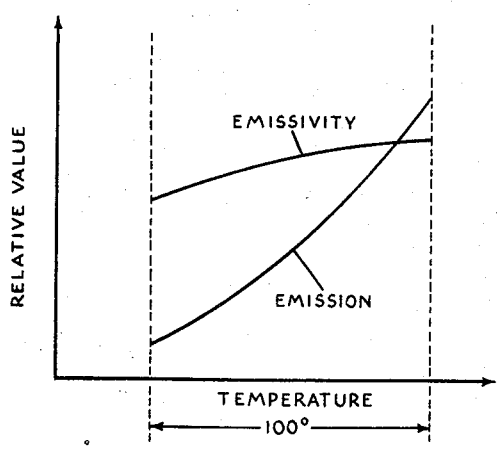

THEIR ATTORNEYS

July 22, 1958 W. S. TANDLER ET AL 2,844,730
DUAL WAVELENGTH RADIANT ENERGY MEASUREMENT SYSTEMS
Filed Jan. 31, 1955 3 Sheets-Sheet 3

INVENTORS
WILLIAM S. TANDLER
MORRIS GROSSMAN
RICHARD H. TOURIN
BY
THEIR ATTORNEYS

United States Patent Office 2,844,730
Patented July 22, 1958

2,844,730

DUAL WAVELENGTH RADIANT ENERGY MEASUREMENT SYSTEMS

William S. Tandler, New York, Morris Grossman, Brooklyn, and Richard H. Tourin, Flushing, N. Y., assignors to The Warner & Swasey Research Corporation, Cleveland, Ohio, a corporation of Ohio Application January 31, 1955, Serial No. 485,262

29 Claims. (Cl. 250—43.5)

This invention relates generally to radiant energy measurement methods and apparatus, and more particularly to methods and apparatus of this character for obtaining an indication determinative of the temperature of hot bodies.

Disclosures which are related in part to that of this application appear in applicants' copending applications, Serial Nos. 484,884 and 484,982, both filed on January 31, 1955.

In measuring the temperature of combustion reaction gases or other very hot bodies, the measurement conditions are often such as to exclude the use of conventional measuring instruments operative by direct contact with, or introduction into the body. This is so, since for example, such conventional instruments cannot withstand without injury, direct exposure to the high temperatures involved. Thus it becomes necessary to make hot body temperature determinations by radiant energy measurement at a distance. Such radiant energy measurements have, however, not previously been used extensively for gases for the reason that no satisfactory methods and apparatus have been developed in the prior are for obtaining measurements fully determinative of the temperature of the hot body.

It is an object of this invention, accordingly, to provide radiant energy measurement methods and apparatus adapted to give one or more measurements fully determinative of the temperature of an observed hot body.

Another object of the invention is to provide methods and apparatus of the above-noted character characterized by elimination of factors extraneous to the mentioned temperature determination.

A further object of the invention is to provide methods and apparatus of the above-noted character wherein the mentioned temperature determination may be made by measurement of a single quantity determinative thereof.

These and other objects of the invention are realized by methods and apparatus wherein radiant energy, extending over a range of wavelengths in the infra-red spectrum and radiation outward from the hot body, is collected at a distance from the hot body into an optical path. The radiant energy in the whole range of wavelengths is then filtered to select therefrom only radiant energy in a band of wavelengths significantly correlated with the temperature of the hot body. Thereafter, the radiant energy in the selected band of wavelengths is caused to generate one or more electrical signals which are further modified to provide one or more indications determinative of the temperature of the hot body.

As a feature of the invention, the radiant energy may take the forms of energy absorbed by the hot body and energy emitted by the hot body, the two forms of radiant energy differing by a given characteristic permitting discrimination therebetween.

As another feature of the invention, the form of radiant energy representing emission from the hot body may be used alone to provide an indication determinative of the temperature of the hot body.

The invention may be better understood from the following detailed description of representative embodiments thereof taken in conjunction with the accompanying drawings wherein:

Figs. 1 and 2 are graphs explanatory of certain aspects of the invention;

Fig. 3 is a plan view in schematic form of apparatus in accordance with the invention;

Fig. 4 is a graph explanatory of a method in accordance with the invention;

Figure 5:
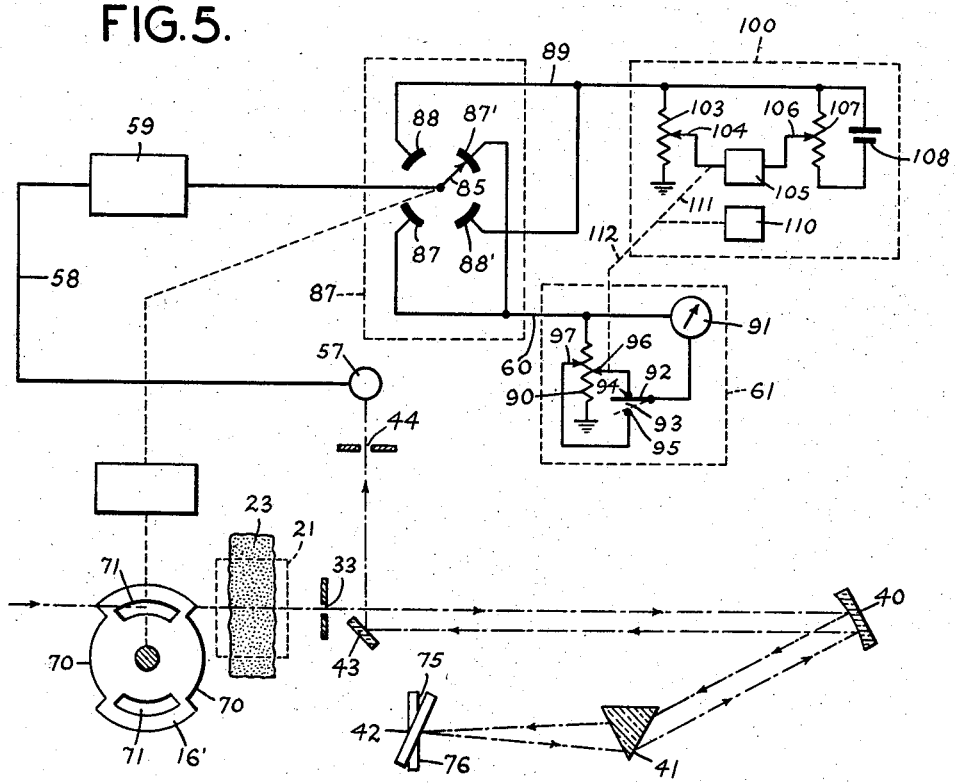
Fig. 5 is a schematic diagram of certain details of the apparatus of Fig. 3.

Considering the phenomenal basis for the present invention, it is an experimental fact that all hot combustion gases emit radiation as a result of their temperature, and that this radiation occurs at certain narrow bands in the infra-red region of the spectrum. The radiation is contributed by all polyatomic and heteronuclear diatomic molecular species, present in the gas, e. g., $CO_2$, CO, OH. Homonuclear molecules, such as $N_2$ and $O_2$, do not radiate. This method involves two basic physical laws: Planck's law and Kirchhoff's law.

All emitters of thermal radiation (heat radiation) give off energy in accordance with the following law:

$$I_\lambda = e_\lambda J_\lambda = e_\lambda [c_1 A \lambda^{-5} (\epsilon^{c_2/\lambda T} - 1)^{-1}] \quad (1)$$

where:

$I_\lambda$=spectral radiant intensity of the emission. Spectral radiant intensity is defined as the energy per unit spectral bandwidth emitted by the source in one second through unit solid angle.

$J_\lambda$=spectral radiant intensity of a "blackbody" radiator, defined below.

$e_\lambda$=is called the emissivity, and is a quantity (of a value less than or equal to one) characteristic of the material (gas, liquid or solid).

$c_1$ and $c_2$ are physical constants.

$A$ is the area of the hot surface.

$\lambda$ is the wavelength of the radiation.

$\epsilon$ is the base of natural logarithms.

$T$ is the absolute (Kelvin) temperature.

The quantity in square brackets is called the Planck function. When the emissivity, $e_\lambda = 1$, the formula becomes $$I_\lambda = J_\lambda = c_1 A \lambda^{-5} (\epsilon^{c_2/\lambda T} - 1)^{-1} \quad (2)$$

This is known as the Planck radiation law. No real physical object radiates exactly in accordance with this law. The Planck law is followed exactly only by an ideal thermal radiator, called a blackbody. A blackbody is defined as an object which absorbs all radiation received by it. Most objects actually reflect some of the radiation they receive, and transparent materials also transmit some radiation. The closest physical approximation to a blackbody is a small hole in a closed cavity, since radiation entering such a hole is unlikely to find its way out again. The fraction of incident radiation absorbed by an object is called its absorptivity. By definition a blackbody has an absorptivity equal to one, or 100%.

A plot of Equation 2 is shown in Fig. 1 for three temperatures $t_1$, $t_2$, $t_3$. A continuous family of such curves exist for all values of temperature.

The second physical law of importance is Kirchhoff's law. This can be stated in two ways. First, if $I_\lambda$ is the spectral radiant intensity of radiation emitted from an object and $a_\lambda$ is the absorptivity of the object, then $$\frac{I_\lambda}{a_\lambda} = J_\lambda \qquad (3)$$

In other words, the ratio of spectral radiant intensity to absorptivity equals the spectral radiant intensity of a blackbody at the same temperature. The second way of stating Kirchhoff's law is to start by defining the emissivity factor, $e_\lambda$, of Equation 1 as the ratio of the spectral radiant intensity of a hot object to the spectral radiant intensity of a blackbody at the same temperature. Then Kirchhoff's law becomes $$e_\lambda = a_\lambda \qquad (4)$$

Attention is now called to the subscript $\lambda$, which occurs in $e_\lambda$ and $a_\lambda$. This subscript signifies that the quantities refer to radiation of a specific wavelength or narrow wavelength band, not to total radiation. The fact is that Equations 3 and 4 generally hold only for single wavelengths or narrow wavelength bands. There are materials, called "gray bodies" which obey Kirchhoff's law over a wide range of wavelengths but gases do not.

In the general terms of abstract quantitative values, temperature is determined according to the invention as follows. Referring to Equation 3, the values $I_\lambda$ and $a_\lambda$ of the hot body at a specific temperature are determined. From these values is calculated the ratio $I_\lambda/a_\lambda$, to determine $J_\lambda$. Finally with the entries $J_\lambda$ and wavelength $\lambda$, the temperature is read off on the blackbody curve. For greatest convenience in making such entries, the data shown in Fig. 1 are plotted in the graphs shown in Fig. 2 for the wavelength values $\lambda_1$, $\lambda_2$, $\lambda_3$, for example. It will be understood that the number of such curves can be increased indefinitely. The data for a given curve in Fig. 2 may be obtained by reading off points along a line such as the dotted line in Fig. 1.

Referring now to Fig. 3 which shows one form of apparatus suitably used in conjunction with the above described procedure, the numeral 13 designates a unit adapted to act as a source for a beam 20 of infra-red radiation 14. To this end the source unit 13 includes an element 15, as, say, a Nernst glower or other glower, adapted to to emit radiant energy. Measurements may be made according to the invention if this radiant energy is within the wavelength range of 1-5 microns in the infra-red spectrum. The radiant energy emanated from glower 15 follows an optical path including the following elements: a motor-driven source chopper 16, a shutter 17, a flat infra-red mirror 18 and a spherical condenser mirror 19 also reflective of infra-red energy. The spherical mirror 19 projects the beam 20 of infra-red radiation from source unit 13 through a sampling region 21 to the receiver unit 22. The term "sampling region" is used here for convenience in describing the invention. The measurement is performed without disturbing or acting upon the hot body in any way, other than to pass a beam of radiation through it, and the sampling region may be located at any conveniently accessible portion of the hot body; it is not meant here to imply by the word "sampling" that a sample of the hot body must be taken out for measurement.

The sampling region 21 contains the hot body whose temperature is to be determined. This hot body may be, for example, a very hot gas 23.

During passage through region 21 of the infra-red beam 20, the radiant energy thereof undergoes absorption at certain discrete wavelengths of the spectral distribution range of the radiant energy. As stated, the wavelengths at which absorption takes place are characteristic of the constituent gaseous components of the gas 23. One of these absorbed wavelengths is used in the course of a measurement as a measuring wavelength for temperature determination.

Gas 23, being at a very high temperature, will also emit infra-red radiation over a spectral distribution range at particular wavelengths characteristic of its constituents and corresponding in value with the absorption wavelengths of these constituents. It follows that the beam departing from gas 23 always includes a quantity of emission radiation 24 at the measuring wavelength. When source unit 13 is not operating, the beam 25 entering receiver unit 22 is constituted entirely of this emission radiation 24. On the other hand, when source unit 13 is operating, the beam 25 entering receiver unit 22 will be constituted in part of emission radiation 24 and in part of the source radiation 14 subject to absorption in region 21.

The infra-red beam 25 entering receiver unit 22 follows an optical path which includes the following infra-red reflective elements: a spherical condenser mirror 30, a plane mirror 31 and another plane mirror 32. The last-named elements together with the optical elements of source unit 13 are of such characteristic in configuration and spacing to focus an incandescent image of the glower source 15 upon an entrance slit 33 marking the beginning of a monochromator section in receiver unit 22. Interposed in the optical path between mirror 32 and slit 33 is a motor-driven receiver chopper 34 whose function will be described hereafter.

Within the monochromator section, radiation framed by the illuminated entrance slit 33 illuminates a collimator mirror 40 which sends a beam of parallel radiation to a prism 41. The prism 41 disperses into component wavelengths the spectral distribution range of the radiant energy within the beam. The dispersed radiation from prism 41 impinges upon a Littrow mirror 42 which reflects the dispersed radiation back upon the prism. The dispersed radiation thereby goes through prism 41 a second time, undergoing further dispersion, and is returned to the collimator mirror 40. Mirror 40 focuses the radiation back in the general direction of the entrance slit 33, but before reaching the same, the retrogressive beam from mirror 40 is intercepted by the plane mirror 43 and directed to the exit slit 44 marking the end of the monochromator section.

The prism 41 has the effect of "fanning out" the radiation beam incident thereon so that each wavelength in the spectral distribution range of the beam is represented by a fan of radiation leaving the prism at a different angle to the prism face. Radiation of only one fan at a time can have the proper incidence angle on the reflective angle from the Littrow mirror in order that the radiation of the fan will, after reflection, follow a proper path by which it passes through exit slit 44. As later more fully described, the Littrow mirror may be split to have two reflecting faces set to different angles. In this case the beam traversing slit 44 will be composed of two separate bands of wavelengths. Each of these bands is narrow compared to the infra-red spectrum of the energy in the beam traversing entrance slit 33. Moreover each of these bands occupies a separate position in the spectrum, one band being centered about the measuring wavelength and one band being centered about a "standardizing" wavelength to be later more fully described.

As stated a wavelength significant as a measuring wavelength would be the common value absorption and emission wavelength of a given constituent of the gas. Thus, if gas 23 represents the products of a combustion reaction, the selected measuring wavelength may be one of the infra-red absorption and emission wavelengths for carbon dioxide or water vapor.

It will be seen that the width of the respective bands of wavelengths depends upon the optical characteristics of the elements in the monochromator section, particularly the widths of entrance slit 33 and exit slit 44 in their dimensions crosswise to the optical path. Within the contemplation of the invention, the width of the passed wavelength bands is of 0.002 micron at the least. This specified band width value, although relatively small compared to the 1–5 microns spectral distribution range over which the measuring wavelength may be selected according to the present invention, is relatively large compared to the 0.00007–0.0002 micron bandwidth which would be used if it were desired to reslove into its fine structure the infra-red radiation entering the receiver unit 22.

As a practical matter, a narrow band of wavelengths may be considered to act, for most of the purposes of the invention, as if all the radiant energy in the band were manifested at the center wavelength. Accordingly, if proper in the context, it will be understood that observations concerning a given wavelength are to be construed as applying to a band of wavelengths having the given wavelength for a center value.

With the radiation beam having been limited, in wavelength content as described, the beam passes through the exit slit 44 and along an optical path including the plane mirror 55 and the ellipsoidal condenser mirror 56. Mirror 56 focuses the radiation upon a detector 57 which is preferably a photosensitive device responsive to infrared as, say, a lead sulfide cell, but which may be another type of infra-red sensing means as, say, a thermocouple or a bolometer. The detector 57 responds to the incident beam by developing an electrical signal in accordance with the intensity of the incident radiation. The electric signal so developed is supplied via electrical coupling means 58 to an amplifier unit 59 to be later described in greater detail. The amplifier unit 59 is coupled by electrical coupling means 60 with a registering unit 61, to be later more fully described, adapted to perform a registering action in the nature of indicating and/or recording and/or a similar operation. In the presence of the signal from detector 57, the amplifier unit 59 and registering unit 61 cooperate together to provide a reading or readings representing the intensity of the detected radiation.

The described apparatus may be utilized in the carrying out of both "double-sided" and "single-sided" methods for determining the temperature of the hot gas 23 in the sampling region 21. Assume that the standard value for the effective radiation 14 at measuring wavelength from source unit 13 is $I_0$, and that the apparatus in connection with making reading of the value I, has been initially calibrated on the assumption that the source radiation 14, in fact, stays constant at this value $I_0$. The method is initiated by streaming the hot gas 23 through sampling region 21. As the next step, the glower 15 and source chopper 16 cooperate to produce a pulsating beam of radiation 14 from source unit 13. At the same time the chopping action of receiver chopper 34 on the beam 25 is eliminated by, say, removing the receiver chopper 34 entirely from the beam or by stopping the chopper in an angular position where the beam passes continuously through the chopper. The detector 57 will accordingly generate an A. C. signal representing the intensity of source radiation 14 at measuring wavelength after absorption in gas 23. The detector 57 will also generate a D. C. signal representing the unchopped radiation 24 emitted from gas 23, but this D. C. signal is eliminated by the A. C. amplifier 59. It follows, in the step just described, that the registering unit gives a reading of the value I.

The reading of I having been made, the radiation 14 is eliminated as a factor in the measurements. This may be done by, say, closing the shutter 17 in the source unit 13 to cut off this radiation entirely. While radiation 14 is thus eliminated the receiver chopper 34 is rendered operative to chop the emission radiation 24 from gas 23. This chopped emission radiation is translated by detector 57 into electrical signals which actuate the registering unit 61. The readings yielded by the registering will now represent $I_\lambda$, the intensity of the gas emitted radiation.

From the readings thus obtained, the temperature of gas 23 may be determined as follows. From the reading I and the value $I_0$ the absorptivity value, $a_\lambda$, can be determined by the following equations $$I = I_0(1 - a_\lambda) \tag{5}$$

$$a_\lambda = 1 - \frac{I}{I_0} \tag{6}$$

Having determined $a_\lambda$, the value of the ratio $I_\lambda/a_\lambda$ is calculated. From Equation 3 the value of this ratio equals $J_\lambda$. Using the wavelength value λ at the measuring wavelength and the determined value of $J_\lambda$, the graph in Fig. 2 is entered to determine the temperature of gas 23.

From the nature of the described apparatus, it will be evident that the readings obtained by registering unit 61 represent relative rather than absolute indications of the values of the variables entering into the determination of gas temperature. Accordingly, it is necessary that the apparatus be calibrated to establish a correlation between the obtained readings and the scale values of the graph in Fig. 2. This calibration may be effected in accordance with a procedure discovered by the applicants and outlined in a publication entitled, "Infra-Red Monochromatic Radiation Methods," published in May 1950 by the Wright-Patterson Air Force Base, Dayton, Ohio, as Air Force Technical Report No. 6064. The essential features of this calibration are the calculation, from measurement of radiant emission at a single temperature from a standard radiation source, of a complete curve of equavilent blackbody intensity against temperature for the measuring apparatus. This standard radiation source may be any suitable radiation source, the temperature of which can be determined by an optical pyrometer, using a filter of equivalent wavelength 0.667 micron as prescribed by the International Temperature Scale of 1948.

The procedure of calibration outlined in the mentioned publication, inasmuch as it involves accurate extrapolation by calculations from a single measured temperature value, extends the range of determinable temperature far beyond the usual limit of 1500° C. when the calibration is made by actual measurements of the range of temperatures of a conventional calibrating source, the 1500° C. figure being the highest temperature which can be conveniently reached by such source, and this procedure is simpler and more accurate than actual measurements over the entire range. In fact, according to the present invention, there is no upper limit for the determinable temperature, and, in practice, it has been possible to measure the temperature of combustion gases varying all the way from 600° C. to 3550° C.

The described doubled-sided method requires determination at measuring wavelength of both the emissivity of the gas (by measurement of its absorption) and of the emission of the gas. It has previously been considered that the use of both such factors was necessary because of the previously held belief that temperature was not the sole physical parameter determining the value of these factors, and that, conversely, it was not feasible to work backwards to temperature from one of these factors by way of a simple quantitative correlation. We have discovered, however, in at least the case of the measurement of the temperature of a gas in the nature of a product of a premixed combustion reaction, that the values of the factors, temperature, emissivity, and emission all change with a change in the value of the fuel-air ratio of the burning mixture, but that, taking this relation into account, for particular temperature ranges and within acceptable accuracy limits, the temperature variation may be considered as correlated with the emission variation only. This fact is illustrated in Fig. 4. As shown therein, over a relatively small (for example, 100°) temperature range, the emission changes pronouncedly with temperature, but the emissivity remains almost constant. Thus, within this temperature range, to an accuracy of one or two percent, the emissivity can be considered constant. By Equation 4, the emissivity $e_\lambda$ equals the absorptivity $a_\lambda$. Hence, any temperature within this small range can be determined to an acceptable accuracy by using the same value over the entire range for the term $a_\lambda$ in Equation 3, once the proper value for $a_\lambda$ in this range has been ascertained.

It has further been found that at high temperatures the curve of emissivity versus temperature levels off completely (or, in other words, shows saturation) and hence the absorption factor $a_\lambda$ in Equation 3 may be replaced by a constant over a much larger range at high temperatures.

It follows that within particular ranges wherein the emissivity is or may be considered constant the temperature of appropriate hot bodies is determinable by a "single-sided" method wherein the source unit 13 is not used, and wherein the radiation entering receiver unit 22 consists entirely of the radiation 24 emitted from the hot body. The intensity of this radiation is, in the usual manner, registered by the registering unit 61. The reading of $I_\lambda$ thus obtained is utilized to determine temperature according to the procedure, heretofore described, of finding $J_\lambda$ and entering the graph of Fig. 2 with the found value of $J_\lambda$ and the value of $\lambda$, the measuring wavelength.

Of course, if the actual temperatures within a given "constant" emissivity range are desired, it is necessary to determine, at least once, the actual value of emissivity obtaining at a representative temperature in the range. This emissivity determination may be made, for example, by the double-sided method heretofore described. Having once been determined, the emissivity value can be used as a constant to thereafter determine all temperatures in the range.

The single-sided method is of greatest application, not in the measurement of temperatures which may vary much more widely than the variation comprehended by a "constant" emissivity range, but rather in conjunction with a temperature control system which automatically restores a drifted temperature to a reference value. In such mode of control, the largest temperature drift which can occur before correction may be corrected by a temperature determination which assumes that the emisivity is constant. In this application of the single-sided method, it is clear that the absolute value of the temperature measured is of little importance. It is only necessary that the temperature be measured in a relative sense to determine the amount of any drift occurring with respect thereto.

It will be noted in both the case of the basic form of double-sided method and of the single-sided method that the radiation measured by detector 57 occupies a bandwidth of 0.002 micron at the least. The broadness of this bandwidth is advantageous inasmuch as it permits an initial calibration of the apparatus and later measurements by the apparatus at a mean wavelength which, in theory, should be the same for the calibration and for the measurement, but which in the course of the actual measurements may drift away from the calibration value because of slight changes in the optical system and so forth. By employing a relatively broad bandwidth of measured radiation, the error-producing effect of this drift upon the obtained readings is minimized for the reason that the relatively broad bandwidth contains a large number of fine infra-red lines, none of which can individually affect to any great extent the average intensity value of the bandwidth as detected by the detector 57. Hence, a change in composition of the bandwidth by a few infra-red lines from one measurement to another will have a negligible effect upon the accuracy of the readings. On the other hand, were the bandwidth to be so narrow that only a few infra-red lines were contained therein, the intensity of each line would be critical to the measurement, and a change by a few lines in the bandwidth composition, or a slight change in the width itself of the band, would cause a substantial error in the readings. An additional advantage to said broadness of bandwidth is that the optical system required is much simpler than that required to resolve the spectrum into its fine structure components. Still a further advantage is that the energy radiated by the hot body within said bandwidth is sufficient to enable a high degree of accuracy in the measurement, while the energy available from a bandwidth including only a few infra-red lines would be too small to measure accurately.

The practice of the described double-sided method is based upon the assumption that, throughout a given measurement and from one measurement to another, the intensity of the effective body of radiation 14 emitted by source unit 13 will continue constant at value $I_0$ in the course of measurement. This assumption is not truly characteristic of the situation obtaining in actual practice. It is common experience that the output radiation from glower source 15 will fluctuate in amount with the passage of time. Also, even if these fluctuations could be eliminated to result in constant output radiation from the glower, it is often the case that a change occurs in the amount of this radiation effective in the measurement. This change results from a change in optical alignment between the source unit 13 and receiver unit 22. It should be noted that slight shifts in this optical alignment (caused by ever present vibration, or handling of the apparatus during measurements) will produce drastic changes in the amount of radiation 14 which is effective.

Referring now to Figure 5 which shows an organization by which changes in the effective value of $I_0$ are corrected for, the optical system for the radiation beam is so consructed that the radiation beam when on the far side of exit slit 44 consists of time separated radiation pulses which are alternately of infra-red energy at the measuring wavelength and of infra-red energy from source unit 13 at a standardizing wavelength. This standardizing wavelength is different than any of the absorption-emission wavelengths of the constituents of hot gas 23. In other words, the standardizing wave length is one wherein the hot gas 23 is completely transparent to radiant energy from source unit 13 at this wavelength. Moreover, it is evident that the hot gas 23 emits no radiation at the standardizing wavelength.

Various optical combinations are feasible for producing this duality in the wavelength nature of radiation beam 25. For example, if the reflecting surface of the Littrow mirror 42 is a plane surface overall, the separate measuring and standardizing wavelength contents of beam 25 can be produced in alternation by a cyclically energized solenoid 50 (Figure 3) operable (during the alternate pulses of the beam generated by the source chopper) to shift the angle of the mirror back and forth between the two respective positions appropriate for passage through the exit slit of the measuring wavelength only and of the standardizing wavelength only. As another example, a Littrow mirror 42 with an overall plane reflecting surface may be maintained in stationary angular position while a pair of exit slits, appropriately located to respectively pass the measuring wavelength only and the standardizing wavelength only, are, during alternate pulses of the radiation beam, closed and opened in opposite phase by a cyclically energized solenoid means. If desired, the monochromator section of receiver unit 22 can be dispensed with altogether, and the alternate value wavelengths for the radiation beam can be produced by a source chopper which generates pulses in an otherwise cut-off beam by alternately inserting into the beam an optical filter passing only the reference wavelength and an optical filter passing only the standardizing wavelength.

According to the showing of Figure 5, the wavelength alternation in the radiation beam is provided by the mutually related characteristics of a source chopper 16' and the Littrow mirror 42. As to the first of these elements the chopper 16' is characterized by a pair of oppositely disposed open sectors 70, 70' in the periphery of the chopper. The chopper also has formed therein a pair of oppositely arcuate slots 71, 71' in 90° relation with the open sectors 70, 70'. The slots 71, 71' are of such radial position that the outer margins thereof lie radially inwards of the bottoms of sectors 70'. The total angle occupied by the mentioned sectors and slots around the chopper circumference is less than the total circumference.

In respective correspondence with the sectors 70, 70' and the slots 71, 71' of the chopper, the Littrow mirror 42 is split into a pair of separate segments 75, 76 furnishing respective reflecting faces for infra-red radiation. Of these two segments, the segment 75 is set to the angle which (by the described wavelength filtering action of the monochromator section) selects out radiant energy of measuring wavelength for passage through exit slit 44. The segment 76 on the other hand is set to the angle selecting out radiant energy of standardizing wavelength for such passage.

Optically, the segments 75, 76 are respectively related to the sectors 70, 70' and slots 71, 71' of the source chopper in the sense that the sectors 70, 70' are optically conjugate with segment 75, and the slots 71, 71' are optically conjugate with segment 76.

By virtue of the described optical features of the chopper and the Littrow mirror, pulses in the radiation beam which alternate between measuring and standardizing wavelength are obtained in the following manner. When an open sector of the chopper is in the radiation beam, the radiation passing therethrough will fall only upon the segments 75, 76 of the Littrow mirror. Thereupon, only radiant energy of measuring wavelength passes through exit slit 44. On the other hand, when a slot 71 or 71' is in the radiation beam, the radiation passing through this slot will fall only upon the segment 76 of the Littrow mirror. It follows, thereupon that only radiant energy of the standardizing wavelength passes through exit slit 44. Between the intervals when an open sector or a slot is in the beam, the beam will be cut off by the solid body of the chopper. Since chopper 16' is continuously driven in rotation by a chopper motor 80, the result obtaining is that the beam emerging from the exit slit will consist of pulses of radiant energy alternately at the measuring wavelength and at the standardizing wavelength, the pulses being interposed with intervals when the beam is cut off.

The intensity values of the energy in the pulses of both wave lengths are translated in the usual manner into electric signal values by the detector 57. The electric signals so derived from the detector are in the nature of electric pulses which are amplified by the A. C. amplifier unit 59. Since amplifier unit 59 is an A. C. amplifier, the amplifier will screen out the extraneous factor of the substantially continuous level signal derived from the gas emitted radiation 24 (Fig. 3). The amplifier unit will, however, faithfully amplify the pulse signals from the detector. Fidelity in amplification occurs for the reason that the duration of the pulses is sufficiently short compared to the duration of the intervals therebetween. Thus the amplifier has adequate time to recover after each pulse. At the output of the amplifier, the signal produced thereby will have alternate excursions from reference level representing infra-red intensity at measuring wavelength and infra-red intensity at standardizing wavelength.

To segregate these two alternate wavelength values, the output of amplifier 59 is impressed on the rotary contact 85 of a synchronous rectifier 86 provided with a pair of oppositely disposed fixed sector contacts 87, 87' and another pair of oppositely disposed fixed sector contacts 88, 88' at right angles to the contacts 87, 87'. Contacts 87, 87' are tied together to provide one rectifier output on lead 60. The other contacts 88, 88' are tied together to supply another rectifier output to a lead 89. Rotary contact 85 is driven by motor 80 at synchronous speed with the rotation of the chopper 16'. Moreover, the rotary contact and the fixed contacts of the synchronous rectifier are spatially phased with respect to the angular position of chopper 16' to provide for closure of contact 85 with a fixed contact 87 or 87' and with a contact 88 or 88', respectively, when a sector 70 or 70' and a slot 71 or 71' of the chopper is located in the radiation beam. Accordingly, the synchronous rectifier 86 causes the separate measuring and standardizing wavelength signals to be respectively distributed to the leads 60 and 89.

The signal on lead 60, representing infra-red energy intensity at measuring wave length, is fed to the registering unit 61 comprising, first, a potentiometer 90 coupled between lead 60 and ground, and, second, a rectifying volt meter 91 having one terminal coupled to lead 60. The other end of the voltmeter is coupled to the movable contact 92 of a single pole double throw selector switch 93 having a pair of fixed contacts 94, 95 respectively connected with a pair of independently positionable taps 96, 97 on the potentiometer 90. As later more fully described, the switch 93 is thrown to connect voltmeter 91 with tap 96 and tap 97, respectively, when readings are taken of the values I and $I_\lambda$.

By virtue of these circuit connections, the voltmeter 91 gives a reading in proportional relation to the strength of signal on lead 60. The value of the ratio, voltmeter reading/signal strength, is, however, determined by the setting on potentiometer 90 of the tap used.

The signal on lead 89, representing the intensity of infra-red energy at standardizing wavelength, is supplied to a correction system 100 within which the signal is impressed across a potentiometer 103 having a variable position tap 104. The voltage appearing on tap 104 is opposed in a servo-amplifier 105 to a reference voltage developed on the variable position tap 106 of another potentiometer 107. This voltage is developed from a fixed voltage source in the form of, say, a battery 108 connected across potentiometer 107. If the voltage on tap 104 differs at any time from the voltage on tap 106, the servoamplifier 105 in a well known manner will operate a servomotor 110 connected by linkages 111, 112 to tap 104 in correction system 100 and to tap 96 in registering unit 61. The servomotor 110 in response to the difference signal moves tap 104 over potentiometer 103 until equality between the two voltages is restored. Simultaneously with such movement of tap 104 the servomotor 110 produces a like movement of the variable tap 96 over potentiometer 90.

Considering how self-correcting effects are obtained by the described embodiment, at adjustment the radiation emitted from source unit 13 (Figure 3) at measuring wavelength is brought to a standard value of $I_0$. As stated, the radiant energy of standardizing wavelength is derived from source unit 13 and is not affected in any manner by the presence of the hot gas 23 in sampling region 21. Also this radiant energy may be considered to have a value $I_0'$ which is related to $I_0$ by a predeterminable quantitative relation. The signal appearing on lead 89 varies in accordance with the value $I_0'$. Thus, the voltage on tap 104 is a measure of the value $I_0$ as this value is modified by the setting of tap 104.

The setting to position of tap 96 produces a corresponding setting to position of tap 104 through linkage 112. After being so set, tap 104 will exhibit a voltage to ground dependent on its setting and on the strength of the $I_0'$ signal. This voltage on tap 104 is initially balanced out with respect to servoamplifier 105 by setting tap 106 to have the same voltage to ground as tap 104. The adjustment is now completed, and the apparatus is ready to take temperature measurements.

In these temperature measurements, one of the steps of the described double sided method is, as mentioned, to obtain readings on volt meter 91 of, I, the intensity of the radiation from source unit 13 after being subjected to absorption by passage through the hot gas 23. In the course of such measuring step the effective intensity $I_0$ of the source radiation emitted from source unit 13 may vary for the reasons hitherto stated, namely because of fluctuation in the output of glower 15 or because of a shift in the optical alignment between the source unit and the receiver unit 22. Accompanying such change in the effective value of $I_0$ there will occur changes in the readings of the value I which are in fact caused by the variation in $I_0$, but which could be interpreted as a change in absorptivity of the gas 23 if it is assumed that the value $I_0$ remains constant. Thus, if the change in $I_0$ is not in some manner allowed or corrected for, and the assumption that $I_0$ stays constant is used, the result will be that the obtained I readings will give erroneous values for the absorptivity $a_\lambda$ of the gas 23. On the other hand, if changes in $I_0$ are not allowed or corrected for, and the assumption that $I_0$ stays constant is not used, it will not be known whether changes in the I readings should be attributed to changes in $I_0$ or to changes in the absorptivity of the gas.

The described apparatus as adjusted permits proper use of the assumption in the calculations that $I_0$ stays constant. The assumption may be made because the apparatus acts to balance out a change in $I_0$ in the following manner. A change of $I_0$ at measuring wavelength will be accompanied by a corresponding change in the value $I_0'$ of the radiant energy emitted by source unit 13 at standardizing wavelength. This change in $I_0'$ will be manifested as a change in the voltage on tap 104. An unbalance is thereby produced between the voltages on taps 104 and 106 to cause the servomotor 110 to move the tap 104 to a new position on potentiometer 90 whereat the tap is restored to a balanced voltage condition relative to tap 106. In so moving tap 104 the servomotor 110 likewise moves tap 96 over potentiometer 90. The potentiometers 90 and 103 are mutually weighted in resistance value to allow for the relative difference between the intensities, $I_0$ and $I_0'$, of the radiant energy emitted from source unit 13 at measuring wavelength and at standardizing wavelength, respectively. Also, the taps 104 and 96 cooperate with their respective potentiometers in such manner that a change in $I_0$ in one direction will be followed by an off-setting change in the other direction of the I reading on voltmeter 91. For example, if the value $I_0$ decreases, the accompanying decrease in $I_0'$ results in a lower voltage across potentiometer 103. The lower voltage across the whole potentiometer results in upward movement of tap 104 to restore its voltage balance with tap 106. This upward movement of tap 104 is in turn communicated to tap 96 to increase the I reading of voltmeter 91.

Thus, any change in $I_0$ is compensated for by an opposite change in the value of the ratio, indicator reading/signal strength, of the voltmeter. As a result the I readings obtained from the voltmeter may be used in the calculations as if the value $I_0$ did, in fact, stay constant.

In the practice of the double sided method the determination of the value $I_\lambda$ is made in the absence of any radiation from source unit 13. This being the case it would be inappropriate for a correction effect representing a function of $I_0$ to be introduced into the voltmeter circuit. Accordingly, in the double sided method, when the $I_\lambda$ readings are made, the selector switch 93 is thrown to couple the voltmeter with tap 97 whose setting on potentiometer 90 is not controlled in accordance with the value of $I_0$. The tap 97 may be set by hand to a position establishing a proper quantitative relation between the I readings and the $I_\lambda$ readings obtained on the voltmeter.

The foregoing description has dealt with the problem of correcting for changes in $I_0$ which result in spurious values of the I readings obtained in the double sided method. In the practice of the single sided method, no such problem is encountered. The reason is that in this method only $I_\lambda$ readings are taken. A somewhat similar problem may arise however in the case where the single sided method is used to determine the temperature of a hot gas located in front of a background object which is also sufficiently hot to radiate infra-red energy at the wavelength used to measure gas temperature. This problem and its solution according to the invention will now be discussed.

Figure 8:
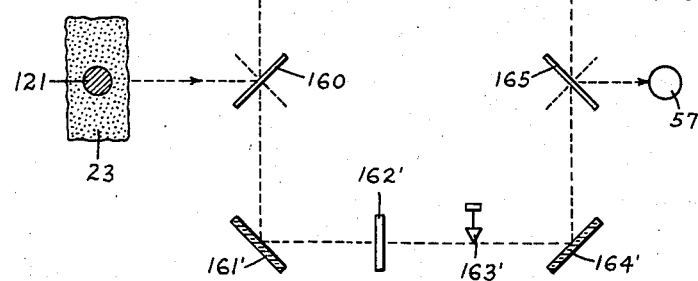
Fig. 8 is a schematic diagram of another modification of the invention.

Referring now to Figure 8, gas 23 whose temperature is to be determined by the single sided method is, in the present instance, in the nature of an exhaust gas which (in terms of the optical path for the radiation beam) flows in front of a background object 121, in, say, the exhaust of a jet engine. The background object 121 is a hot solid radiating object which may be, say, the turbine stator of the engine, but which for present purposes is considered to be the tailcone thereof.

Gas 23, as before, emits infra-red energy in narrow bands of wavelengths occupying discrete positions in the infra-red spectrum. One of these bands, entered about the wavelength value, $\lambda_1$ is used as the measuring wavelength. The tailcone 121, being a solid object, emits infra-red energy which has an essentially continuous infra-red spectrum. Some of this energy will, accordingly, be at the measuring wave length $\lambda_1$ to augment the radiation emitted from gas 23 at this wavelength. Since the apparatus, in detecting radiation of wavelength $\lambda_1$, cannot, in the practice of the single-sided method, distinguish between the separate fractions of $\lambda_1$ radiation respectively emitted from the gas 23 and from the tailcone 121, the effect of this augmentation will be to produce spuriously large $I_\lambda$ readings unless some mode of correction is provided for.

To provide this correction the receiver unit 22 in the form thereof, shown in Figure 3, is replaced (Figure 7) by a simpler receiver unit 22' comprising a receiver chopper 34' and the detector 57 together with the usual optical components (not shown) for guiding and focusing the radiation beam in its optical path. The receiver chopper 34' in the present instance carries a plurality of infra-red optical filters 124, 125, 124', 125' distributed in the order named at angular positions 90° apart around the axis of the chopper. Filters 124 and 124' are of an optical characteristic to permit only radiation substantially at measuring wavelength to pass through the chopper. The filters 125, 125' are, on the other hand, of an optical characteristic to permit only radiation substantially at a standardizing wavelength to pass through the chopper. This standardizing wavelength is, as before, a wavelength which is included within the continuous radiation spectrum of tailcone 121 but which is not included within the spectrum of absorption-emission for a gas 23. Hence, gas 23 is completely transparent to radiant energy emitted from tailcone 121 at the standardizing wavelength.

Also, as a fact of importance, as the temperature of tailcone 121 remains at standard value or changes therefrom, the value of the ratio, intensity at standardizing wavelength/intensity at measuring wavelength, of the radiation emitted from the tailcone will remain constant or change according to a functional relation between the temperature and the ratio value. This functional relation can be established beforehand in a manner well known to the art. Thus, a measured intensity of radiation emitted from the tailcone at standardizing wavelength $\lambda_2$ can be translated into intensity of radiation emitted from this same element at measuring wavelength $\lambda_1$, taking into account the effect of the tailcone temperature upon the relative intensities of the radiation at these two wavelengths.

The receiver chopper 34' is driven by a motor 130 to successively rotate each of the infra-red filters carried by the chopper into the radiation beam. Hence, the radiation received by detector 57 will consist of alternate pulses of radiation at measuring wavelength and at standardizing wavelength, the pulses being interposed between time intervals which occur when the radiation beam is cut off by the solid body of the chopper. The electric signals derived by detector 57 from the radiation incident thereon are fed to the amplifier unit 59 which in the present instance may be a D. C. amplifier. The amplifier unit 59 may also be an A. C. amplifier, since the duration of the intervals between the radiation pulses is sufficiently long relative to the duration of the pulses themselves, that the amplifier has time to recover between pulses.

The output of amplifier 59 is fed to the rotary contact 85 of the synchronous rectifier 86 also shown in Figure 5. In this synchronous rectifier 86 the oppositely disposed pair of fixed contacts 87, 87' are commonly connected to ground through the parallel combination of a resistor 140 and capacitor 141, while the mutually opposite pair of fixed contacts 88, 88', in 90° relation with contacts 87, 87', are commonly connected to ground through the parallel combination of a potentiometer 142 and a capacitor 143. A voltmeter 145 is connected by one terminal to the ungrounded ends of resistor 140 and capacitor 141. The other terminal of voltmeter 145 is connected to a tap 146 adapted to slide over the potentiometer 142.

Considering the operation of the organization just described, the rotary contact 85 is driven by motor 130 in synchronism with the rotation of receiver chopper 34'. Moreover, the rotary contact and fixed contacts of the synchronous rectifier 86 are spatially phased with respect to the angular position of the chopper so that the output of amplifier unit 59 is coupled with contacts 87, 87' and with contacts 88, 88' when, respectively, the filters 124, 124' and the filters 125, 125' are located in the radiation beam by rotation of the chopper. Thus, the portion of the amplified signal representing intensity at measuring wavelength will develop a voltage across resistor 140 and capacitor 141. Likewise, the portion of the amplified signal representing radiation at the standardizing wavelength will develop a voltage across the parallel combination of potentiometer 142 and capacitor 143. While the separate signals representing radiation at these different wavelengths are each in the form of pulses, the capacitors 141 and 143 will have an integrating effect on the respective signals received thereby. As a result substantially steady voltages will appear across each of the two mentioned networks of a resistor and a capacitor in parallel.

Figure 6:
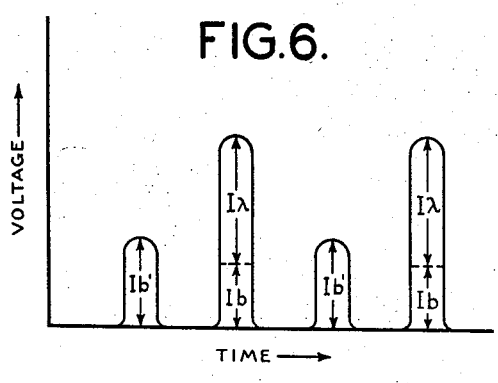
Fig. 6 is a waveform diagram of aid in explaining a mode of operation of the invention.

As shown in Figure 6, when one of the filters 124, 124' is in the radiation beam to pass only radiation of substantially the measuring wavelength, the output voltage from amplifier unit 59 has a voltage representing the value $(I_\lambda + I_b)$ where $I_\lambda$ and $I_b$ are the respective intensities at measuring wavelength of the radiation emitted by gas 23 and the radiation emitted from tailcone 121. When one of filters 125, 125' is in the radiation beam to pass only radiation substantially of standardizing wavelength, the output signal from amplifier unit 59 has a voltage value representing $I_b'$, the intensity of radiation emitted from tailcone 121 at standardizing wavelength. For a particular temperature of the tailcone, the two values $I_b$ and $I_b'$ will remain in fixed ratio. Hence, as shown in Figure 6 the desired $I_\lambda$ voltage value can be obtained from the $(I_\lambda + I_b)$ signal by subtracting from this signal a predetermined fraction of the $I_b'$ signal, the fraction of $I_b'$ selected being that fraction which equals the value of $I_b$. The determination of what fraction of the voltage $I_b'$ equals the voltage $I_b$ may be made by calculations which take into account the respective spectrum characteristics of the radiation from gas 23 and from tailcone 121 as these characteristics are modified in the radiation beam by the optical characteristics of the infra-red filters 124, 124' and 125, 125'.

The described $(I_\lambda + I_b)$ and $I_b'$ voltage signals appearing at the output of amplifier unit 59 will be reproduced in relative proportion across, respectively, the parallel network of resistor 140 with capacitor 141 and the parallel network of resistor 142 with capacitor 143. In these networks the scaling down of the voltage $I_b'$ to a fractional value thereof equal to $I_b$ is accomplished by a proper setting of the tap 146 on the potentiometer 142.

Thus, the voltage appearing between tap 146 and ground will be equal to $I_b$. Since voltmeter 145 is connected to respond to the difference between this $I_b$ voltage and the $(I_\lambda + I_b)$ voltage which appears, as referenced to ground, across the parallel elements 140, 141, the reading of voltmeter 145 will be the desired reading of $I_\lambda$ the intensity at measuring wavelength of the emitted radiation from gas 23.

It is thus seen that, for a particular temperature, the apparatus just described is adapted in the practice of the single-sided method to give true readings of $I_\lambda$ despite admixture of background radiation at measuring wavelength with radiation emitted from the gas at measuring wavelength. Moreover, these two readings will be obtained despite changes in the relative percentage of background radiation and gas radiation making up the entire content of the radiation beam at measuring wavelength. The accuracy of the $I_\lambda$ readings depend, however, on the fact that the ratio $I_b/I_b'$ remains constant, and the constant quality of this ratio can, in some instances, be counted on only when the temperature of the background object does not vary appreciably.

Figure 7:
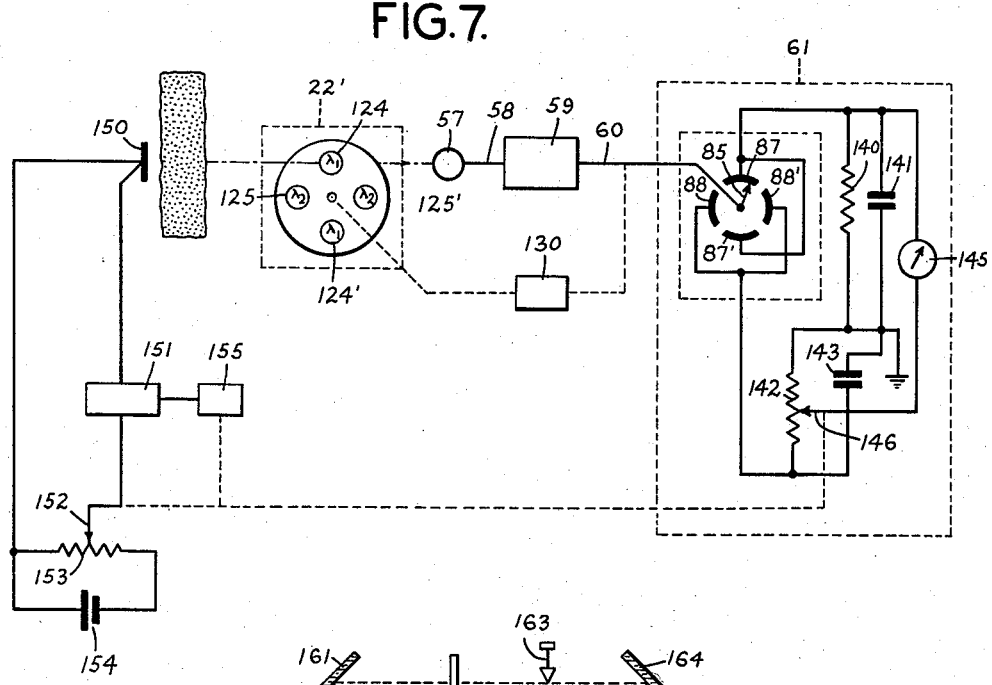
Fig. 7 is a schematic diagram of a modified form of the apparatus.

In those instances where the ratio $I_b/I_b'$ can, in fact be expected to vary appreciably with the temperature of the background object, it is still possible to obtain accurate $I_\lambda$ readings by utilizing a means which compensates for a change in temperature of the background object. As shown in Figure 7 this means takes the form of a thermocouple 150 in contact with tailcone 121 to generate a voltage as a function of the temperature thereof. The voltage generated by the thermocouple is opposed in a servoamplifier 151 to a reference voltage which remains constant during a measurement but which may be set to a desired value for a given measurement. Such reference voltage may be, say, the voltage appearing on a tap 152 of a potentiometer 153 connected across a fixed voltage source as, say, a battery 154. The servoamplifier 151 responds to a difference between the thermocouple voltage and the reference voltage to drive a servomotor 155. The servomotor is linked in a well known manner with the tap 152. In the presence of a difference signal detected by the servoamplifier, the servomotor 155 resets the tap 152 to a position restoring a balance between the thermocouple voltage and the reference voltage.

The servomotor 155 is linked not only with the tap 152 but with the tap 146 as well. Hence, a change in temperature of the tailcone 121 will, through the casual sequence of changing the thermocouple voltage to unbalance the servoamplifier to drive the servomotor, result in a change in the position of tap 146 of the potentiometer. Such change in the tap position has the effect of modifying the fractional amount of the voltage $I_b'$ which, in its role as the value equivalent of $I_b$, is subtracted as described from the voltage $(I_\lambda + I_b)$. Thus, by selecting proper initial settings for the taps 146, 152 on their respective potentiometers, and by selecting properly weighted resistance values for these potentiometers, all of which can be done in a well known manner, any change in the value of the ratio $I_b/I_b'$ as a function of temperature can be corrected for in the manner and by the means just described.

A modification of the apparatus of Figure 7 is shown in Figure 8. In this modification the beam of radiation is again derived from the gas 23 and the background object 121. This radiation beam alternately is shifted between two optical paths by a beam splitter 160. In one optical path the radiation passes from the beam splitter 160 to the detector 57 by way of the following elements: a plane mirror 161, an infra-red filter 162, an attenuator 163, another plane mirror 164, and a beam combiner 165. Likewise, in the other optical path the radiation passes to detector 57 by way of the analogous elements of: a plane mirror 161', a filter 162', an attenuator 163', a plane mirror 164', and the beam combiner 165. The filters 162 and 162' have respective optical characteristics to pass only radiation substantially at measuring wavelength and only radiation substantially at standardizing wavelength. Hence, the radiation received by detector 57 will consist in alternation of one and then the other of these two forms of radiation.

Figure 9:
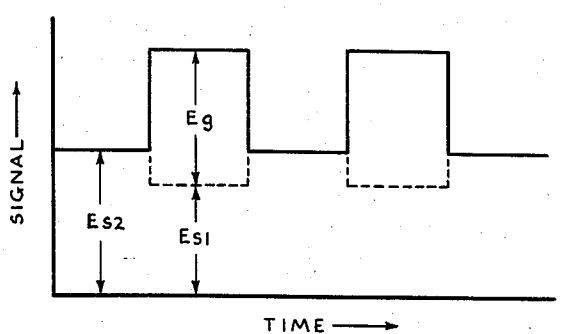
Fig. 9 is a diagram explanatory of the operation of the modification shown by Fig. 8.

The functioning of this modification is illustrated in Fig. 9. In the first position of Fig. 8, radiation passes to detector 57 by way of filter 162' which transmits radiation only at standardizing wavelength. Prior to adjustment, which will be described below, detector 57 receives a pulse of magnitude $E_{S2}$, as shown in Fig. 9. In the second position of Fig. 8, which alternates with the first position, through the functioning of the beam splitter 160 and beam combiner 165, a pulse of magnitude $E_{S1}+E_g$ is received by detector 57, where $E_{S1}$ is the extraneous component consisting of background radiation diminished by partial absorption in the gas, and $E_g$ is the component of gas radiation, which it is desired to measure. By utilizing the well known relation between signal $E_{S2}$ at standardizing wavelength and the background signal $E_{S1}$ at measuring wavelength (at a particular temperature of the background and in conjunction with the known emissivity of the gas) the attenuators 163 and 163' can evidently be adjusted so that the magnitude of the signal $E_{S2}$ is made to equal $E_{S1}$, upon which will be superimposed a varying component of magnitude alternately zero and $E_g$ above the reference level $E_{S1}$. This varying component can be dissociated from the extraneous steady component by the use of an A. C. amplifier in conjunction with detector 57 thereby providing an electrical signal output which is proportional to the gas radiation and containing no component of unwanted background radiation.

The described embodiment being illustrative only, it will be appreciated that the present invention comprehends organizations differing in form or detail from the described embodiment. For example, regarding the correction in the double-sided method for changes in the effective value of $I_0$, the servomotor 110 instead of driving potentiometers could be used to control the opening of a diaphragm to vary the attenuation of the radiation from the glower source 15. Also, if desired, in the double-sided method the correction system 100 can be replaced by a simple meter, and the corrective settings of tap 96 may be made according to the indications of this meter. In the single-sided method, the dual wavelength characteristic of the radiation beam can be obtained by the apparatus of Fig. 5 modified only to the extent that the chopper which coacts with the split Littrow mirror is the receiver chopper rather than the source chopper. The forms of apparatus shown in Figs. 5, 7 and 8 are of application, not only in systems for the determination of temperature, but also in radiant energy measurement systems having other purposes. Moreover these last-named systems may include systems which operate in other than the infra-red portion of the electromagnetic radiation spectrum.

Accordingly, the invention is not to be considered as limited save as is consonant with the scope of the following claims.

We claim:

1. A method for determining by measurement of infra-red radiation at a given wavelength a characteristic of a body of material developing a spectrum of infra-red wavelengths, said method comprising the steps of, collecting into an optical path a solid angle of infra-red radiation emanating from said body, filtering said radiation to obtain in said optical path during alternate time periods a first radiation component substantially limited to said given wavelength and a second radiation component substantially limited to a wavelength different from any wavelength of said spectrum, and producing first and second quantitative indications of the respective intensities, referenced to a standard intensity, of said first and second radiation components, said first indication being an uncorrected indication of said characteristic of said body of material, said second indication providing information as to the quantitative amount by which said first indication should be corrected to render the same a definitive indication of said characteristic.

2. A method as in claim 1 characterized by the further step of physically modifying the quantitative value of said first indication as a function of the quantitative value of said second indication to provide for automatic correction of said first indication.

3. A method for determining by radiation measurement the absorptivity of a body of material at a given infra-red absorption wavelength, said method comprising the steps of, generating infra-red radiation having a spectrum which includes a first wavelength the same as said absorption wavelength and a second wavelength different from any absorption wavelength of said body, passing said radiation through said body to be partially absorbed thereby at absorption wavelengths thereof, thereafter collecting a solid angle of said radiation into an optical path, filtering said radiation to produce in said optical path during alternate time periods a first component of said radiation substantially limited to said first wavelength and a second component of said radiation substantially limited to said second wavelength, and producing first and second quantitative indications of the respective intensities, referenced to a standard intensity, of said first and second components of radiation, said first indication being an uncorrected indication of the absorptivity of said gas, said second indication providing information as to the quantitative amount by which said first indication should be changed to render the same a definitive indication of said absorptivity.

4. A method as in claim 3 characterized by the further step of physically modifying the quantitative value of said first indication as a function of the quantitative value of said second indication to provide for automatic correction of said first indication.

5. A method for determining by measurement of infra-red radiation the absorptivity at a given infra-red wavelength of a high temperature gas, said method comprising the steps of, generating infra-red radiation having a spectrum which includes a first wavelength the same as said given wavelength and a second wavelength different from any absorption wavelength of said gas, passing said radiation through said gas to be partially absorbed thereby at absorption wavelengths thereof, collecting into an optical path a solid angle of said partially absorbed radiation unavoidably mixed with radiation emitted from said gas, filtering said radiation which passes through said gas to produce in said optical path respective wavelength components thereof at said first and second wavelengths during alternate intermittent time periods, developing first and second electrical signals from said first and second radiation components, said signals being indicative in magnitude of the intensities, referenced to a standard intensity, of the radiation components respectively associated therewith, electrically filtering said signals to dissociate therefrom the signal produced by emission-radiation at said first wavelength, electrically separating said first and second signals one from another, and electrically modifying the magnitude of said first signals as a function of the magnitude of said second signals to correct said first signals for intensity changes in said collected partially absorbed radiation caused by factors other than the absorptivity of said gas.

6. A method for determining the radiant emission at a first wavelength of hot gas having a background which emits radiation over a spectrum including said first wavelength and a second wavelength different from any emission wavelength of said gas, said method comprising the steps of, collecting into an optical path a solid angle of the radiation emitted by said gas unavoidably mixed with background radiation, filtering said collected radiation to separate therefrom at alternate intermittent time periods a first component of intermixed background and emission radiation at substantially said first wavelength and a second component of only background radiation at substantially said second wavelength, and producing first and second quantitative indications of the respective intensities, referenced to a standard intensity, of said first and second radiation components, said first indication being an uncorrected indication of the radiant emission of said gas, said second indication providing information as to the quantitative amount by which said first indication should be changed to correct for the extraneous contribution thereto by background radiation at said first wavelength.

7. A method as in claim 6 characterized by the further step of physically modifying the quantitative value of said first indication as a function of the quantitative value of said second indication to provide for automatic correction of said first indications.

8. A method as in claim 6 characterized by the further step of physically modifying the quantitative value of said second indication to be equal to the portion of said first radiation contributed by said background.

9. Apparatus for determining by measurement of infra-red radiation at a given wavelength a characteristic of a body of material developing a spectrum of infra-red wavelengths, said apparatus comprising, an optical system for collecting into an optical path a solid angle of radiating emanating from said body of material, an infra-red filtering system for producing in said optical path during alternate intermittent time periods a first component of said radiation substantially limited to said given wavelength and a second component of radiation substantially limited to a wavelength different from any of the wavelengths of said spectrum, and detector means responsive to said radiation components to produce electrical signals respectively indicative of the intensities, referenced to a standard intensity, of said first and second radiation components, said first signal being an uncorrected indication of said characteristic and said second signal being an indication of the amount by which said first signal should be corrected to render the same a definitive indication of said characteristic.

10. Apparatus as in claim 9 wherein said infra-red filtering system comprises at least two infra-red transmission filters of which one and the other thereof permit respective passages of only said first and only said second of said radiation components, and means adapted to render said filters alternately operative to pass radiation.

11. Apparatus as in claim 9 wherein said infra-red filtering system comprises chopper means adapted when operative to permit passage of said radiation through said optical path only during said time periods, and infra-red filter means operable in synchronism with said passages of said radiation to limit said radiation in said path during alternate ones of said periods to respective ones of said first and second components of radiation.

12. Apparatus as in claim 9 wherein said optical filtering system comprises beam splitter means, beam combiner means and a pair of infra-red transmission filters disposed in separate optical paths between said beam splitter and beam combiner means and adapted to respectively pass only said first and only said second of said components of radiation, said beam splitter means and beam combiner means being operable in synchronism to permit passage of said radiation in said optical path only during said time periods and to produce a filtering of said radiation in said time periods through alternate ones of said filters.

13. Apparatus as in claim 9 wherein said optical filtering system comprises, a prism for angularly dispersing said departing radiation according to the wavelength thereof, diaphragm means having a slit formed therein, first and second infra-red reflectors of said dispersed radiation, each reflector being disposed at a reflecting angle for said dispersed radiation pass through said slit a spectral component thereof substantially limited to a wavelength selected in accordance with the angular setting of the reflector, said first and second reflectors being set to different angles to respectively pass said first and said second radiation components through said slit, and a chopper member having at least two openings therein which are optically conjugate, respectively, with said first and second reflectors so that radiation passing through each opening is reflected only from the corresponding reflector, said chopper member being operable to cause passage of radiation in alternation through one and then the other of said openings.

14. Apparatus for determining by measurement of infra-red radiation at a given wavelength a characteristic of a body of material developing a spectrum of infra-red wavelengths, said apparatus comprising, an optical system for collecting into an optical path a solid angle of radiation emanating from said body, an infra-red filtering system adapted when cyclically operated to produce in said path during alternate time periods a first component of radiation substantially limited to said given wavelength and a second component of radiation substantially limited to a wavelength different from any wavelength of said spectrum, detector means disposed in said optical path to be responsive to said radiation components, said detector means alternately producing first and second electric signals at an output thereof as quantitative indications of the respective intensities, referenced to a standard intensity, of said first and second radiation components, electric signal distribution means coupled to the output of said detector means and adapted when cyclically operated in synchronism with said filtering means to separate said first and second signals into respective channels, and means for producing synchronous cyclical operations of said filtering system and said distribution means.

15. Apparatus as in claim 14 wherein said distribution means comprises rotary switch means.

16. Apparatus for determining by measurement of infra-red radiation at a given wavelength a characteristic of a body of material developing a spectrum of infra-red wavelengths, said apparatus comprising, an optical system for collecting into an optical path a solid angle of radiation emanating from said body, an infra-red filtering system for producing in said optical path during alternate intermittent time periods a first component of radiation substantially limited to said given wavelength and a second component of radiation substantially limited to a wavelength different from any of the wavelengths of said spectrum; detector means disposed in said optical path to be responsive to said radiation components, said detector means alternately producing first and second electric signals as quantitative indications of the respective intensities, referenced to a standard intensity, of said first and second radiation components, said first signal being an uncorrected indication of said characteristic, said second signal being an indication of the correction factor to be applied to said first signal, and correction means for physically modifying the quantitative value of said first signal as a function of the quantitative value of said second signal to render said first signal a definitive indication of said characteristic.

17. Apparatus as in claim 16 wherein said correction means comprises adjustable electric circuit means to provide an output of said first signal in accordance with the setting thereof, and a closed loop servo-system responsive to said second signal to control the setting of said adjustable means as a function of the change in said second signal from a predetermined reference value therefor.

18. Apparatus as in claim 16 wherein said correction means comprises a first network responsive to said first signal to develop a voltage as a function thereof, a second network responsive to said second signal to develop a voltage as a function thereof, and indicating means responsive to the difference between said voltages.

19. Apparatus for determining by measurement of radiation the absorptivity at a given absorption wavelength of a high temperature gas, said apparatus comprising, source means adapted to develop in an optical path which passes through said gas a beam of infra-red radiation with a spectrum which includes a first wavelength the same as said absorption wavelength and a second wavelength different from any wavelength of said gas giving substantial absorption at said temperature said radiation being partially absorbed at absorption wavelengths of said gas during passage therethrough, chopper means disposed in said optical path between said source means and said gas for chopping said radiation to permit passage thereof through said gas only during intermittent time periods, infra-red filtering means cyclically operable to limit in alternation during said periods the partially absorbed radiation in said path to one and then the other of first and second components thereof respectively comprised of radiation at substantially said first wavelength and at substantially said second wavelength, detector means responsive to said components to produce first and second electric signals at an output thereof as respective quantitative indications of the intensities, referenced to a standard intensity, of said first and second components, and electric filtering means in circuit with said detector means to dissociate from said first and second periodic signals a continuous signal generated by said detector means responsive to unchopped emission radiation from said gas at said first wavelength, said first signals being an uncorrected indication of said absorptivity and said second signals being an indication of the correction to be applied to said first signals to render the same a definitive indication of said absorptivity.

20. Apparatus as in claim 19 further characterized by electric signal distribution means connected in circuit with said detector means and adapted when cyclically operated in synchronism with said infra-red filtering means to distribute said first and second signals from said output into respective first and second channels, and means for synchronizing the cyclical operations of said infra-red filtering means and said distribution means.

21. Apparatus as in claim 19 further characterized by correction means for modifying the quantitative value of said first signal as a function of the quantitative value of said second signal to provide for automatic correction of said first signal.

22. Apparatus for determining by measurement of radiation the absorptivity at a given absorption wavelength of a high temperature gas, said apparatus comprising, source means adapted to develop in an optical path which passes through said gas a beam of infra-red radiation with a spectrum which includes a first wavelength the same as said absorption wavelength and a second wavelength different from any wavelength of said gas giving substantial absorption at said temperature said radiation being partially absorbed at absorption wavelengths of said gas during passage therethrough, chopper means disposed in said optical path between said source means and said gas for chopping said radiation to permit passage thereof through said gas only during intermittent time periods, infra-red filtering means cyclically operable to limit in alternation during said periods the partially absorbed radiation in said path to one and then the other of first and second components thereof respectively comprised of radiation at substantially said first wavelength and at substantially said second wavelength, detector means responsive to said components to produce first and second electric signals at an output thereof as respective quantitative indications of the intensities, referenced to a standard intensity, of said first and second components, electric signal distribution means connected in circuit with said detector means and adapted when cyclically operated in synchronism with said infra-red filtering means to distribute said first and second signals from said output into respective first and second channels, means for synchronizing the cyclical operations of said infra-red filtering means and said distribution means, electric filter means in circuit with said detector and distribution means to eliminate from said channels a continuous signal generated by said detector means responsive to emission radiation from said gas, and correction means responsive to said distributed second signal for modifying the quantitative value of said distributed first signal as a function of the quantitative value of said distributed second signal, said correction means providing for automatic correction of said distributed first signal.

23. Apparatus as in claim 22 wherein said correction means comprises an adjustable network in said first channel adapted to provide an output of said distributed first signal in accordance with the setting thereof, and a closed loop servo-system responsive to said distributed second signal to control the setting of said adjustable network as a function of the change in said distributed second signal from a predetermined reference value therefor.

24. Apparatus for determining the radiant emission at a first wavelength of a hot gas located in front of a background object which emits radiation over a spectrum including said first wavelength and a second wavelength different from any emission wavelength of said gas, said apparatus comprising, an optical system for collecting into an optical path a solid angle of intermixed background radiation and radiation emitted from said gas, chopper means adapted by chopping said intermixed radiation to permit passage thereof through said path only during intermittent time periods, infra-red filtering means cyclically operable to limit in alternation during said periods said radiation in said path to a first component of intermixed background and emission radiation at said first wavelength and a second component at substantially said second wavelength of background radiation only, and detector means responsive to said components to produce first and second electric signals at an output thereof as respective quantitative indications of the intensities, referenced to a standard intensity, of said first and second components, said first signals being an indication of said emission radiation at said first wavelength uncorrected for the presence of background radiation at said first wavelength, said second signals being an indication of the correction to be applied to said first signals to correct for said background radiation at said first wavelength.

25. Apparatus as in claim 24 further characterized by electric signal distribution means in circuit with the output of said detector means and adapted when cyclically operated in synchronism with the cyclical operation of said infra-red filtering means to separate said first and second signals at said output into respective first and second channels, and means for synchronizing the cyclical operations of said infra-red filtering means and said distribution means.

26. Apparatus as in claim 24 further characterized by correction means responsive to said second signals to modify the quantitative value of said first signals as a function of the quantitative value of said second signals to provide for automatic correction of said first signals.

27. Apparatus as in claim 26 further characterized by means responsive to the temperature of said background object for controlling said modification of said first signal by said correction means to compensate for temperature induced changes in the relative intensities of background radiation by said object at said first and at said second wavelengths.

28. Apparatus for determining the radiant emission at a first wavelength of a hot gas located in front of a background object which emits radiation over a spectrum including said first wavelength and a second wavelength different from any emission wavelength of said gas, said apparatus comprising, an optical system for collecting into an optical path a solid angle of intermixed background radiation and radiation emitted from said gas, chopper means adapted by chopping said intermixed radiation to permit passage thereof through said path only during intermittent time periods, infra-red filtering means cyclically operable to limit in alternation during said periods said radiation in said path to a first component of intermixed background and emission radiation at said first wavelength and a second component at substantially said second wavelength of background radiation only, detector means responsive to said components to produce first and second electric signals at an output thereof as respective quantitative indications of the intensities, referenced to a standard intensity, of said first and second components, said first signals being an indication of said emission radiation at said first wavelength uncorrected for the presence of background radiation at said first wavelength, said second signals being an indication of the correction to be applied to said first signals to correct for said background radiation at said first wavelength, electric signal distribution means in circuit with the output of said detector means and adapted when cyclically operated in synchronism with the cyclical operation of said infra-red filtering means to distribute said first and second signals at said output into respective first and second channels, a network in said first channel responsive to said first signals to develop a voltage as a function thereof, an adjustable network in said second channel responsive to said second signal to develop a voltage as a combined function of said signal and of the setting in adjustment of said last-named network, indicating means responsive to the difference of said voltages for indicating the value of said first signal as corrected by said second signal, and means responsive to the temperature of said background object for automatically adjusting said adjustable network to compensate for temperature induced changes in the relative intensities of background radiation by said object at said first and second wavelengths.

29. Apparatus as in claim 28 wherein said temperature responsive means comprises, means for generating an electric signal as a function of the temperature of said background object, and a closed loop servo-system responsive to said temperature signal to adjust said adjustable network as a function of the change in said temperature signal from a predetermined reference value therefor.

References Cited in the file of this patent

UNITED STATES PATENTS

| | | |
|---|---|---|
| 2,451,572 | Moore | Oct. 19, 1948 |
| 2,650,307 | Koppius | Aug. 25, 1953 |